United States Patent [19]

Becker et al.

[11] Patent Number: 4,541,245
[45] Date of Patent: Sep. 17, 1985

[54] METHOD AND APPARATUS FOR CALCINING FINE GRAINED MATERIAL

[75] Inventors: Jörgen Becker, Gummersbach; Arno Hendricks, Nümbrecht; Horst Herchenbach, Hennef; Eberhard Steinbiss; Werner Rensinghoff, both of Cologne, all of Fed. Rep. of Germany

[73] Assignees: Klöckner-Humboldt-Deutz AG; L. & C. Steinmüller GmbH, both of Fed. Rep. of Germany

[21] Appl. No.: 673,109

[22] Filed: Nov. 19, 1984

[30] Foreign Application Priority Data

Nov. 18, 1983 [DE] Fed. Rep. of Germany ....... 3341695

[51] Int. Cl.⁴ ........................ F01K 15/00; F27B 15/00
[52] U.S. Cl. ...................................... 60/648; 432/106; 432/14; 110/347; 122/7 R
[58] Field of Search ................. 432/14, 106; 122/7 R, 122/1 R; 110/347; 60/648

[56] References Cited

U.S. PATENT DOCUMENTS

| | | | |
|---|---|---|---|
| 4,310,298 | 1/1982 | Abelitis | 432/14 |
| 4,324,313 | 4/1982 | Blake | 432/14 |
| 4,324,544 | 4/1982 | Blake | 432/14 |
| 4,329,932 | 5/1982 | Takahashi et al. | 110/347 |
| 4,388,067 | 6/1983 | Christiansen | 110/347 |
| 4,392,353 | 7/1983 | Shibuya et al. | 432/14 |
| 4,426,939 | 1/1984 | Winship | 110/347 |
| 4,453,497 | 6/1984 | Davis | 110/347 |
| 4,465,520 | 8/1984 | Jehmlich et al. | 106/100 |
| 4,469,664 | 9/1984 | Abelitis et al. | 432/14 |
| 4,474,010 | 10/1984 | Shibuya et al. | 110/347 |

FOREIGN PATENT DOCUMENTS

3016642 11/1981 Fed. Rep. of Germany .

*Primary Examiner*—Henry C. Yuen
*Attorney, Agent, or Firm*—Hill, Van Santen, Steadman & Simpson

[57] ABSTRACT

Method and apparatus for burning fine grained material, particularly for the manufacture of cement clinker whereby the product quality is enhanced. At least a portion of the exhaust gases from the kiln at a temperature of about 1000° to 1300° C. are cooled by passing them through a steam generator to a temperature of about 200° to 300° C. At least a portion of the noxious substances such as alkali chlorides and sulfur are condensed out of the gas stream as well as possibly some mineral particles such as partially deacidified kiln dust. The materials condensed out of the gas are separated in the steam generator by means of periodic or continuous cleaning of the heating surfaces of the steam generator. The steam which is generated in the generator is conducted to at least one prime mover such as a steam turbine or a steam motor for the purpose of producing electrical or mechanical energy. In this way, the economic feasibility of cement clinker burning systems equipped with bypass devices is considerably increased by exploiting the high thermal potential of the bypass gases.

12 Claims, 4 Drawing Figures

METHOD AND APPARATUS FOR CALCINING FINE GRAINED MATERIAL

BACKGROUND OF THE INVENTION

1. Field of the Invention

This invention is in the field of burning fine grained materials such as employed in the manufacture of cement clinker wherein improved efficiency and improved quality are achieved by passing at least a portion of the exhaust gases through a steam generator to remove noxious substances and to recover the thermal energy in the gases.

2. Description of the Prior Art

Raw cement meals used as starting materials for the manufacture of cement often include undesirable substances such as alkalies, chlorides and sulfur. The undesirable material such as sulfur and chlorine are often found in fuels employed for the thermal treatment of the raw cement meals, particularly when the fuels are of low grade. The alkali problem is of particular significance in cement technology from two points of view. On the one hand, it has been recognized that even slight amounts of alkali oxides in the cement lead to setting problems in the cement. Secondly, particular difficulties arise in modern cement burning systems which utilize suspension type drying processes due to the high alkali and sulfur contents in the raw cement meal and/or in the fuel. These difficulties arise not only because of the altered flow behavior of the raw meal in the heat exchanger, but the noxious substances present also may cause incrustations and caking phenomena in the gas-carrying conduits which make it impossible to provide a careful regulation or control of the burning system. This occurs because the alkali compounds in the sulfur are also included in the substances which are volatilized in the sintering kiln such as the conventional rotary tubular kiln of the burning system. These materials become sticky when they condense out of the exhaust gas of the rotary tubular kiln and lead to caking in the gas-carrying conduits. Moreover, these noxious compounds proceed with the exhaust gas of the rotary tubular kiln into the raw meal preheating system where they precipitate onto the comparatively cooler raw meal and are returned into the rotary kiln in circulation with the preheated raw meal, whereby a highly concentrated circulation of noxious substances can arise in the burning process.

It is known, for example, from DE-OS No. 30 16 642 to withdrawn the hot exhaust gas from the rotary kiln or at least a portion thereof from the burning process by means of a bypass conduit, to cool it down to about 450° C. by the addition of cool air, and subsequently cleanse it of the noxious substances and thereafter discard it. Considerable heat content, however, of the thermally valuable exhaust gas from the rotary tubular kiln is thus lost for the burning process so that the entire burning process can become uneconomical. Particularly in the case of extremely large cement clinker burning systems, it can no longer be justified in terms of heat economy to discard too much rotary kiln exhaust gas which contains noxious substances without exploiting its heat content, since the cement manufacturing costs become too high due to current and anticipated energy prices. A utilization of the bypass gas discarded at about 450° C. and largely freed of its noxious substances would indeed be possible but it is no longer very economical due to thermodynamic reasons. Morever, with the known bypass gas treatment, the volume of exhaust gas to be dedusted is increased up to five-fold due to the admixture of fresh air in the gas cooler, whereby the gas cleaning devices must be of large dimensions.

SUMMARY OF THE INVENTION

The present invention provides a method and apparatus for burning fine grained material, particularly for the manufacture of cement clinker, which improves the efficiency of bypass devices which must be present in order to enhance the product quality and in order to guarantee a disruption-free burning process.

In the method of the present invention, there is a preheater stage, a calcining stage and a sintering stage. At least one substream of the exhaust gas from the sintering stage which contains noxious substances such as alkalies, chlorine, and sulfur, is withdrawn from the system in the region between the sintering stage and the calcining stage by means of a bypass conduit and the noxious substances are removed therefrom. The bypass gas has a temperature of about 800° to 1350° C. and is passed to a steam generator where its temperature is reduced to about 200° to 300° C. At least a portion of the noxious substances are condensed from the bypass gas as well as some mineral particles such as partially dehydrated kiln dust in the steam generator and these substances are removed by continuously or periodically cleaning the heating surfaces of the steam generator. The steam produced in the steam generator can be used to drive a turbine which in turn drives a generator for supplying electrical current to portions of the burning system or the steam can be used to power prime movers which operate drive machinery or operating gas exhaust gas ventilators or the like. In keeping with the present invention, the fine bypass gas dusts which leave the steam generator are separated in a filter downstream of the generator on the exhaust gas side. Those noxious substances which are present in vapor form or in the form of a fog in the bypass gas, such as chlorides or sulfates, are selectively condensed at cold heating surfaces of the steam generator and are selectively discharged therefrom by means of cleaning such surfaces.

As a result of the improvements of this invention, there is an efficient exploitation of the waste heat of the bypass gases of the cement clinker burning system by utilizing the high thermal potential of the bypass gases and converting the same into electrical or mechanical energy. The steam generator of the present invention when operating on the hot stream of bypass gas functions as a bypass gas cooler and simultaneously functions as a solids separator for at least partial cleaning of the bypass gas. The steam generated in the steam generator is used to drive an electrical generator by means of a steam turbine or it can be used to directly drive geared turbines and/or steam motors. As a result thereof, the specific energy consumption of a cement manufacturing plant is considerably reduced. Depending upon the withdrawal rate of bypass gas (up to 100% bypass) a saving of electrical energy on the order of 30 kWh/t of cement, i.e., about 27% of the total consumption of electrical energy (normally about 110 kWh/t of cement) is possible. In addition to the improved exploitation of energy, additional advantages of the invention are as follows.

Raw material feed: As a result of the invention, a more far-reaching exploitation of raw material stocks can be accomplished, i.e., the exploitation of worked strata high in noxious substances such as alkalies, chlorine, or sulfur, thus leading to an expansion of the raw material base.

Use of lower-grade fuels: The intensified use of substitute fuels and/or waste materials in the calciner and/or sintering kiln of the burning system for producing thermal energy required for the process enables a reduction of fuel costs. At the same time, burning such waste materials high in noxious substances necessitates the application of bypass technology. In the prior art hitherto known, the savings achieved in the case of the fuel costs are largely consumed by the measures required for the bypass (waiving the exploitation of the waste heat, and the high gas volume to be dedusted). These disadvantages are avoided by the present invention and the economic feasibility is enhanced with the use of lower grade fuels.

Enhanced product quality: Due to the exploitation of the waste heat of the bypass exhaust gases, it becomes possible to significantly increase the bypass withdrawal rates more economically. As a result thereof, the economical production of low alkali cement is made possible despite the use of raw materials high in noxious substances.

Elevation of efficiency: In comparison to the prior art, utilizing cooling of hot bypass exhaust gases from more than 1000° C. down to about 450° C. by adding fresh air and/or water, the application of the present invention yields the following improvements:

Bypass withdrawal rate can be more than three times the previous amounts with the same unit sizes, i.e., the use of raw material high in noxious substances and/or substitute fuels can be intensified.

In new systems, there will be a reduction of the volume of exhaust gases to about one-third, so that dimensionally smaller dedusting apparatus, conditioning towers, exhaustors, and the like can be employed.

The efficiency of the steam generator increases as a result of the high intake temperature of the bypass gas ranging from about 1000° to 1300° C. and a nearly arbitrary combination of steam pressure and steam temperature can be set. There is also the possibility of exploiting the hot, uncooled bypass gas in a superheater boiler for generating superheated steam such as by operating a saturated steam boiler by the exhaust gas of the raw cement meal preheater and/or by a substream of the exhaust gas from the clinker cooler.

From the standpoint of environmental protection, bypass technology is a pre-requisite for the use of a cement rotary kiln for burning wastes. The exploitation of the heat content of the bypass exhaust gases according to the present invention also permits this procedure to be far more attractive from the economical side. The employment of the cement rotary kiln and/or calciner for burning wastes which have produced very good results up to now in terms of burn-out and elimination of noxious substances, will become even more interesting in the future. A further positive aspect from the standpoint of environmental protection is the fact that different dust fractions having different concentrations of noxious substances can be achieved by means of the selective dust separation in the steam generator and in the dedusting devices that follow downstream on the gas side. It is therefore possible, depending upon the composition, to partially return this dust into the process or to upgrade it for different use purposes such as utilization in the fertilizer industry or in the building materials industry. The waste storage volume is thus reduced. The consumption of water for bypass gas conditioning as well as the dust discharge are lowered due to the reduced clean gas volumes of the bypass exhaust gases.

Personnel costs for the operation of the steam generator are reduced because the steam boiler system for exploitation of waste heat can be equipped with automated cleaning devices for cleaning the heating surfaces. Furthermore, no burners are operated with the steam generator, and it is possible to operate the system in accordance with technical regulations for steam boilers under limited or in the absence of constant supervision. This means that the present personnel for managing the cement clinker burning process are in a position to undertake the supervision of the steam boiler.

The incorporation of the steam generator in the present invention can be realized on the basis of various possibilities. For reasons of availability, the steam generator should be attached as directly as possible to the withdrawal location of the bypass gas at the product admission chamber of the rotary tubular kiln. For that purpose, a single or multi-train steam boiler can be erected above the rotary tubular kiln in straddling fashion. According to a specific feature of the invention, the steam generator can be suspended with a simple means outside of the cyclone suspension-type heat exchanger tower of the raw cement meal preheater and calciner, the tower being erected from structural steel or reinforced concrete.

BRIEF DESCRIPTION OF THE DRAWINGS

The present invention and its further advantages and features will be explained in connection with illustrative embodiments schematically shown in the Figures in which.

DESCRIPTION OF THE PREFERRED EMBODIMENTS

Figure 1:
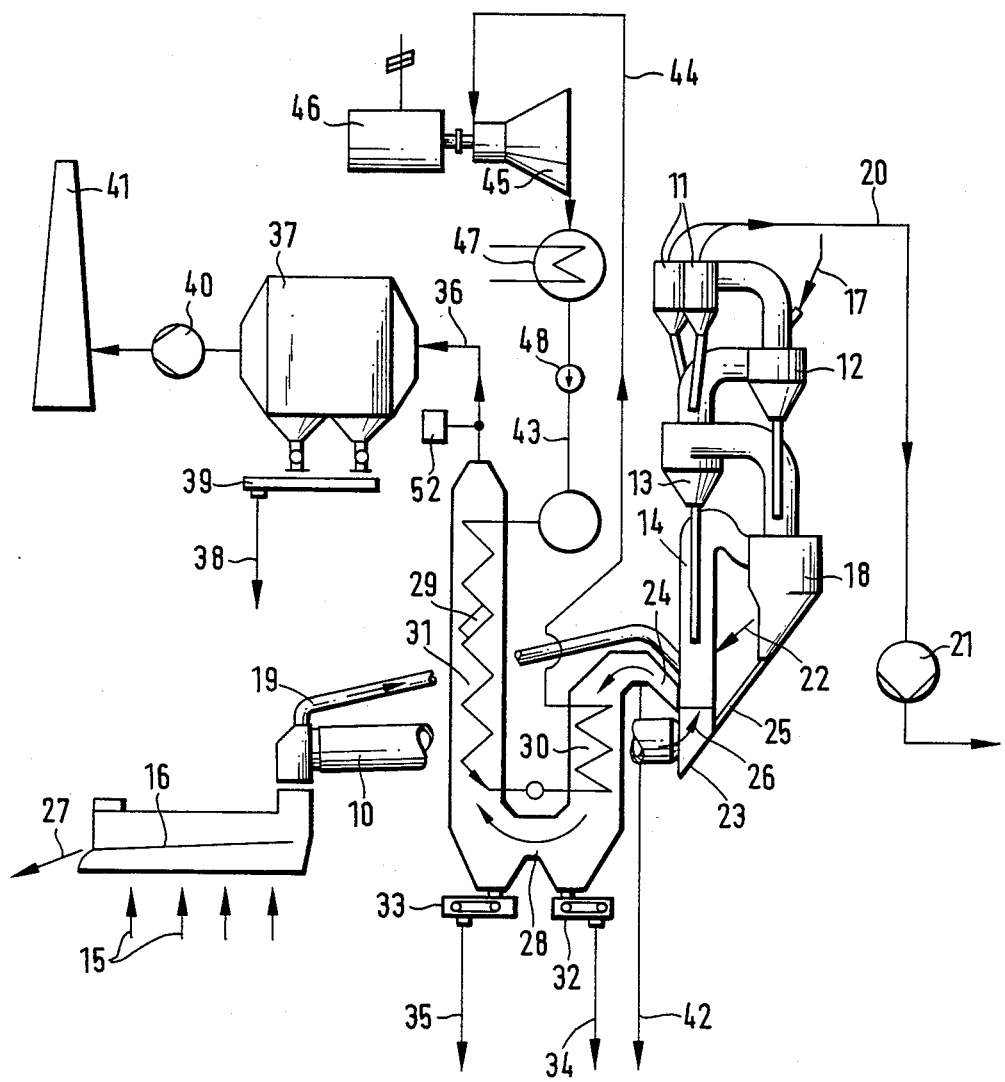
FIG. 1 is a schematic illustration of a burning system for the manufacture of cement clinker and including an integrated steam generator.

The burning system of FIG. 1 includes a rotary tubular kiln 10 which is preceded upstream by a raw cement meal preheater consisting of a plurality of cyclone heat exchangers 11, 12 and 13 and by a calciner 14. The kiln 10 is followed downstream by a clinker cooler 16 which is supplied with cool air through inlets 15. Raw cement meal is introduced through an inlet 17 from the top to the bottom through the cyclone heat exchangers 11, 12 and 13 in sequence and then through the calciner 14. A lowermost heat exchange cyclone 18 is connected in combined concurrent/countercurrent flow to the hot exhaust gases leaving the rotary tubular kiln 10 and/or to the hot exhaust air from the cooler 16 which is conducted to the calciner 14 by means of a tertiary air conduit 19. Exhaust gases leaving the heat exchangers by means of the line 20 are withdrawn by means of an induced draft blower 21. A fuel inlet 22 in the calciner 14 serves to provide fuel into the rotary kiln exhaust gas duct for high-grade calcining of the raw cement meal. A bypass conduit 24 is provided for the withdrawal of rotary kiln exhaust gases (bypass gases) containing noxious substances. The bypass conduit is disposed in the rotary kiln exhaust gas duct to the calciner 14 or in the cover of the product admission chamber 23 of the rotary tubular kiln, or at the side thereof. The bypass gas typically has dust contents of about 10 g/per normal cubic meter.

The calcined raw cement meal enters the admission chamber 23 of the rotary tubular kiln through its inlet conduit. The exhaust gas from the kiln is withdrawn as indicated by the arrow 26, and sintered cement clinker which has been cooled in the cooler 16 is withdrawn as indicated by the arrow 27.

In accordance with the present invention, the bypass gas in the conduit 24 has a temperature of about 800° to 1350° C., preferably at 1000° to 1200° C. This gas is cooled in a steam generator 28 to a temperature of about 200° to 300° C., for example, about 220° to 250° C. which is above the dew point of sulfuric acid. At least a portion of the noxious substances are condensed out of the bypass gas and, under some conditions, partially deacidified kiln dust also deposits on the heating surfaces of the steam generator, the deposited substances being separated from the gas by means of periodic or continuous cleaning of the heating surfaces of the steam generator 28. Such devices are indicated at reference numeral 29 and may consist, for example, of vibration generators and/or pneumatic devices which periodically place the heating surfaces of the boiler in vibration and in any case strip the developing cake of condensed noxious substances and partially deacidified kiln dust from the surfaces. The noxious substances such as chlorides and/or sulfates present in the bypass gas in the form of vapor of in the nature of a fog can also be selectively deposited by condensation on the cold heating surfaces of the steam generator, i.e., they can be discharged from the steam generator 28 separately from the mineral particles.

The steam generator 28 is preferably in the form of a two-train or two-stage reversing boiler having a radiant train 30 cooling the bypass gas from about 1000° to 1300° C. to about 500° to 600° C., and a convection train 31 following the radiant train which cools the previously cooled bypass gas down to about 220° to 250° C. There is a solids collector containing discharge elements 32 or 33 which is disposed at the lower end of the radiant train 30 and the convection train 31. The noxious substances are withdrawn as indicated by the line 34, these substances having been condensed from the bypass gas at the higher temperature and are withdrawn from the discharge element of the radiant train 30. The noxious substances condensed at the lower temperature are withdrawn from the discharge element 32 through a line 35 of the convection train together with, under some conditions, partially deacidified kiln dusts which are separated from the bypass gas.

The cooled bypass gas leaving through a line 36 departs the steam generator 28 at a temperature of about 220° to 250° C. The fine bypass flue dusts contained in the line 38 are recovered in a subsequent filter such as an electrostatic dust separator 37. The fine bypass gas dusts are withdrawn by means of a discharge member 39. The bypass gas is suctioned through the steam generator 28 as well as through the separator 37 which may consist of a fabric filter by means of a dedusting ventilator 40 which conveys the cleaned bypass gas to a stack 41. The steam generator 28 can be preceded upstream at the gas side of a pre-separator, for example, a deflection separator for separating the coarse bypass gas dusts in the line 42, particularly the partially deacidified kiln dust entrained by the bypass gas. This coarse dust is capable of being recirculated into the burning system together with the dust in the line 34 which has condensed at the higher temperatures and whose concentration of noxious substances is not very high. By contrast, dusts in the line 38 which have higher concentrations of alkali chlorides and sulfates can, for example, be utilized in the fertilizer industry. If the chlorides and sulfates have been largely separated in the steam generator 28, then the product from line 38 can be advantageously sold as a hydraulic bonding agent which is low in noxious substances.

The feeding water conduit 43 delivers feed water to the steam generator 28 and enters into the convection train 31. The steam produced leaves through a steam conduit 44 from the radiant train 30. The steam conduit 44 leads to a relaxation turbine 45 comprising a power generator 46 and/or at least one steam engine or a geared turbine. The generator 46 can supply current for use in the cement clinker burning system, for example, for the electric drive motor of the induced draft blower 21 which is disposed downstream of the raw cement meal preheater, or for other uses. When the steam produced in the steam generator 28 is conducted to at least one steam engine and/or a geared turbine, these prime movers can be used directly to drive machinery of the cement clinker burning system, for example, exhaust gas ventilators, mills or the like. The steam condensed in the condenser 47 is returned to the steam generator 28 by means of a pump 48 as boiler feed water.

Figure 2:
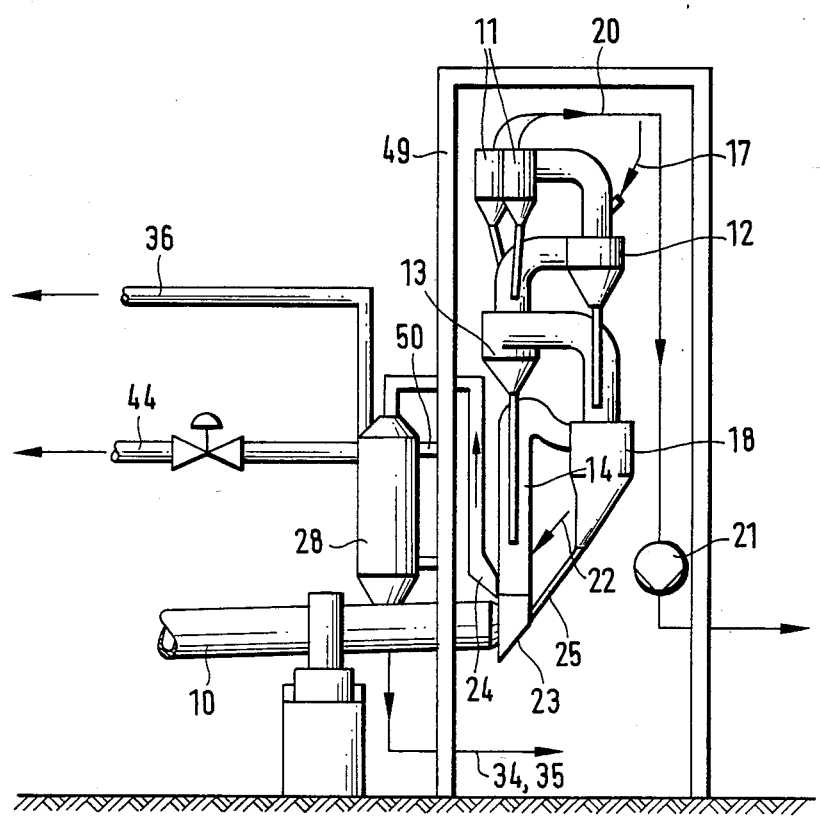
FIG. 2 is a schematic illustration of the manner in which the steam generator can be incorporated into the cement clinker burning system of FIG. 1.

The incorporation of the waste heat boiler 28 to exploit the waste heat of the bypass gases of the cement clinker burning system can be realized by means of various possibilities. For reasons of availability, the steam generator 28 is joined as directly as possible to the withdrawal point of the bypass gases at the product admission chamber 23 of the rotary tubular kiln 10. For this purpose, a single-train or multi-train steam boiler can be erected above the rotary tubular kiln 10 in straddling fashion. In a particular feature of the present invention as shown in FIG. 2, the steam generator 28 is externally suspended at the cyclone suspension type heat exchanger tower 49 of the raw cement meal preheater and calciner which is composed of structural steel or reinforced concrete, the steam generator being suspended therein in a simple fashion as by means of support mounts 50. The cement clinker burning system of FIG. 2 employs parts coinciding with those of FIG. 1, and are provided with the same reference numerals.

Figure 3:
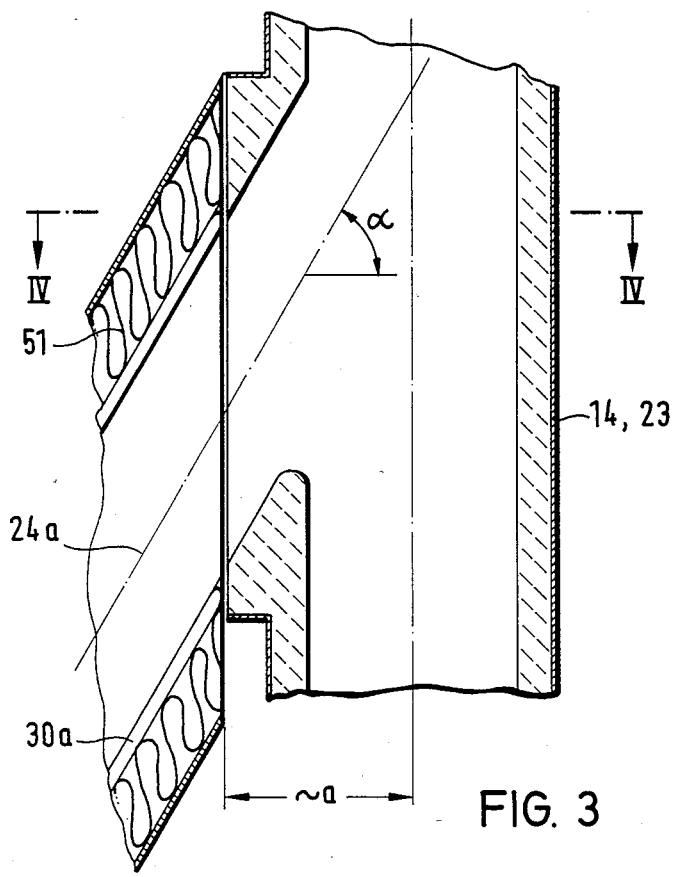
FIG. 3 is a vertical sectional view through the immediate connection between the steam generator at the beginning of the bypass conduit of the burning system, shown in enlarged detail.

From the embodiment illustrated in FIG. 3, it will be seen that the radiant train of the steam generator 28 is directly connected to the product admission chamber 23 of the rotary tubular kiln 10 or to the calciner 14, being attached thereto by means of a bypass conduit 24a provided with boiler heating surfaces 30a and thermal insulation 51. The bypass conduit 24a is downwardly inclined at an angle α of about 40° to 75°, preferably 50° to 60°, relative to the horizontal. It is thus assured that the materials to be cleaned or condensed from the bypass gas cannot fall back into the admission chamber 23 or into the rotary tubular kiln where they could cause caking.

Figure 4:
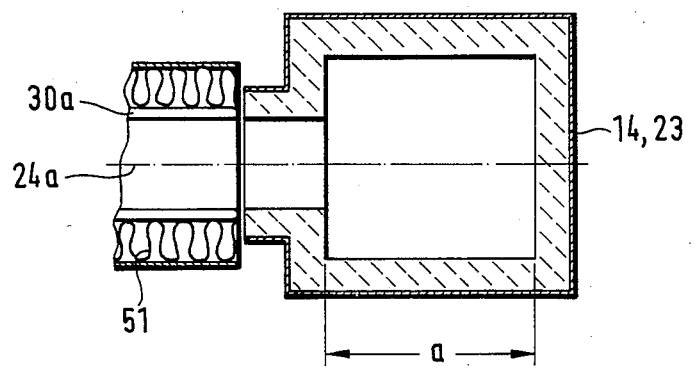
FIG. 4 is a horizontal section taken substantially along the line IV—IV of FIG. 3.

FIG. 4 illustrates that the radiant train of the steam generator 28 is connected to the product admission chamber 23 of the kiln 10 or to the calciner 14 with a spacing of about 0.5 to 4a, typically 0.6a, where the distance "a" is equal to the inside diameter of the cross section of the admission chamber 23 or of the calciner 14.

It may also be seen from FIG. 1 that an analyzer 52 for measuring the quantity and/or the composition of the bypass gas is connected to the bypass gas conduit 26 at a location preferably downstream of the steam generator 28. The stream of bypass gas in the line 36 can be very precisely measured quantitatively and qualitatively with the analyzer 52 since, in contrast to the prior art, there is no water injection or fresh air feed required for the purpose of cooling the bypass gas, as these additions would invalidate the measured result. As a consequence of the exact measured results, that withdrawal of bypass gas which is just sufficient can be set exactly. It is then easily possible to determine the composition of the kiln exhaust gases exactly as a result of the elimination of adding fresh air and/or water into the bypass gas to cool the same. With knowledge of the gas constituents such, for example, as $CO_2$, $N_2$ CO, $SO_2$, $NO_x$, or $O_2$, it is possible to manage in an optimum way or control the burning process in view of energy consumption and environmental compatibility.

It should be evident that various modifications can be made to the described embodiments without departing from the scope of the present invention.

We claim as our invention:

1. A burning system for the manufacture of calcined products such as cement clinker from raw meal comprising:
    a raw meal preheater,
    a calciner receiving the preheated meal from said preheater,
    a sintering kiln receiving calcined meal from said calciner,
    a cooler receiving clinker from said sintering kiln,
    a bypass conduit connected between said calciner and said sintering kiln for collecting at least a portion of the exhaust gases from said sintering kiln,
    a steam generator receiving the discharge of said bypass conduit, and
    means for cleaning the heating surfaces of said steam generator to thereby remove noxious substances which have condensed thereon from said exhaust gases.

2. A burning system according to claim 1 wherein said steam generator is a two-train reversing boiler having a radiant train capable of cooling said exhaust gases from about 850° to 1350° C. to about 500° to 600° C., and a convection train capable of further cooling said gases down to about 200° to 300° C.

3. A burning system according to claim 2 which includes a first discharge member located at the lower end of said radiant train for collecting noxious substances condensed out of said exhaust gases at high temperatures and a second discharge member located at the lower end of said convection train for collecting noxious substances condensed out of said exhaust gases at lower temperatures.

4. A burning system according to claim 1 which includes an electrostatic dust separator downstream of said steam generator for separating fine dusts from said exhaust gases.

5. A burning system according to claim 1 which includes a pre-separator for separating coarse dusts from said exhaust gases upstream of said steam generator.

6. A burning system according to claim 2 which includes:
    a feed water conduit for introducing water into said convection train,
    a steam conduit for discharging steam from said radiant train, and
    a steam-operated prime mover coupled to said steam conduit.

7. A burning system according to claim 1 wherein:
    said preheater consists of a plurality of cyclone type heat exchangers, and
    a tower supporting said heat exchangers,
    said steam generator being suspended from said tower.

8. A burning system according to claim 1 wherein:
    said steam generator straddles said sintering kiln in the vicinity of the product admission chamber of said kiln.

9. A burning system according to claim 2 which includes a bypass conduit connecting said steam generator directly to the product admission chamber of said kiln,
    said bypass conduit including boiler heating surfaces and being downwardly inclined at an angle of about 40° to 75° relative to the horizontal.

10. A burning system according to claim 9 wherein said steam generator is connected to said product admission chamber with a spacing of from 0.5 to 4 times the inside diameter of said admission chamber.

11. A burning system according to claim 2 which includes a bypass conduit connecting the radiant train of said steam generator directly to said calciner.

12. A burning system according to claim 1 which includes an analyzer downstream of said steam generator for measuring properties of the gases leaving said steam generator.

* * * * *